United States Patent [19]

Rapata

[11] 4,124,320

[45] Nov. 7, 1978

[54] LINKAGE QUICK-CONNECT FASTENER

[75] Inventor: George M. Rapata, Schaumburg, Ill.

[73] Assignee: Illinois Tool Works Inc., Chicago, Ill.

[21] Appl. No.: 780,217

[22] Filed: Mar. 23, 1977

[51] Int. Cl.² .................... F16C 11/06; F16D 1/12
[52] U.S. Cl. .................... 403/163; 403/188;
151/41.75; 85/84
[58] Field of Search ............. 403/161, 188, 289, 252,
403/376; 85/80, 84; 248/71, 74 PB; 151/41.75

[56] References Cited

U.S. PATENT DOCUMENTS

| 3,431,813 | 3/1969 | Johnson | 85/84 X |
| 3,550,219 | 12/1970 | Van Buren | 248/74 PB |

FOREIGN PATENT DOCUMENTS 2,433,102  2/1975  Fed. Rep. of Germany .......... 403/188

Primary Examiner—Wayne L. Shedd
Attorney, Agent, or Firm—Jack R. Halvorsen; Robert W. Beart

[57] ABSTRACT

A one-piece plastic quick-connect fastener for coupling a rod carrying abutment means to a work member having an aperture therein. The fastener includes a head and a shank with a slot passing through the head and shank and terminating short of the free nose end of the shank to form a resilient hinge which permits the symmetrical portions of the head and shank to flex toward and away from one another. The head includes a recess having complimentary means for engaging the abutment means on said rod to restrain axial movement of the rod relative to the recessed head.

12 Claims, 10 Drawing Figures

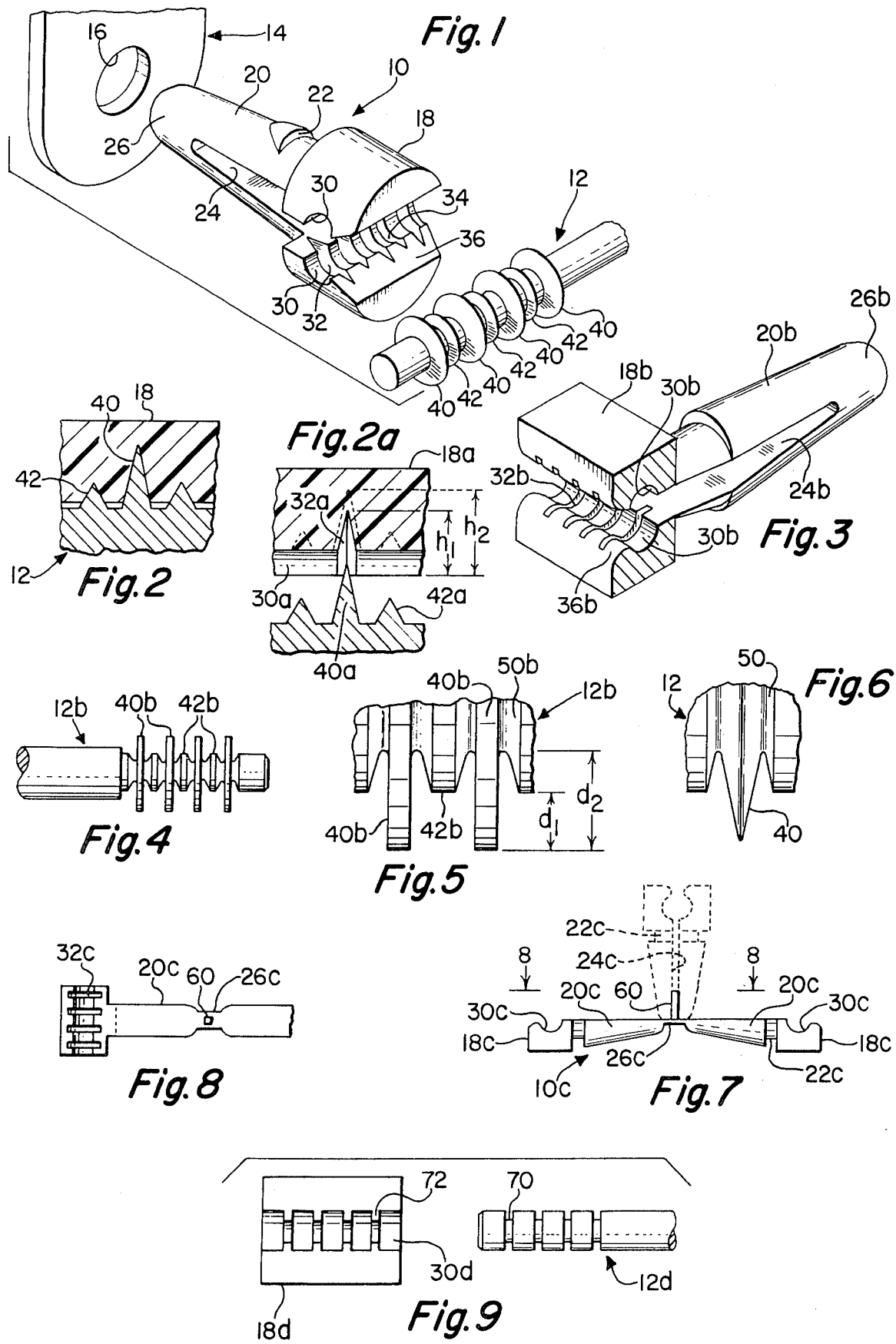

LINKAGE QUICK-CONNECT FASTENER

BACKGROUND OF THE INVENTION

The prior art for this invention can be found in U.S. Class 403, Subclass 163, which generally covers connecting means, such as rod end connectors.

An important prior art reference is U.S. Pat. No. 3,832,074 issued on Aug. 27, 1974, to David C. Dehar for "linkage quick-connect device", as well as to U.S. Pat. No. 3,231,300 issued on Jan. 25, 1966, to W. N. Moroney for "connecting means". These patents are exemplary of a number of patents showing devices for connecting an operating rod to a lever or other workpiece. In certain of these patents, such as Moroney U.S. Pat. No. 3,231,300, the inventors have made provisions for a quick coupling action involving the fitting of a bent end of the rod into an axially disposed bore as well as having means for snap fitting the rod into a recess in the head of the connecting device. These do not provide for any axial adjustment of the rod. The Dehar U.S. Pat. No. 3,832,074 was an attempt to provide a connecting means which allowed for adjustment of the fastening device relative to the axial positioning along the coupling rod. The Dehar device taught the use of a threaded rod where the normal threads have a 60° included angle between the oppositely facing faces of each thread, thereby providing a ramp angle of 30°. When a 30° ramp angle is loaded axially, the axial forces tend to cause mating surfaces to slip. This is further magnified when the thread form, as taught by Dehar U.S. Pat. No. 3,832,074, includes the helix angle of the thread. In loading the link rod, a slight cocking action between the link rod and the fastening device takes place. In fact, there are instances of where the link rod or elongated member actually becomes displaced relative to the fastening device.

SUMMARY OF THE INVENTION

It is an object of the present invention to provide a connecting means that allows a connecting rod to be rapidly assembled with a fastening device at any of a predetermined number of points along the axis of the rod without requiring any further adjustment.

The present invention relates to a linkage quick-connect device for coupling a rod having a plurality of axially spaced annular rings to a workpiece or lever member having an aperture therein. The fastening means comprises a head having a dimension greater than the diameter of the aperture in the workpiece and an axially extending shank. A slot extends axially of the fastener through the head toward the end of the shank remote from the head to provide spaced symmetrical shank and head portions with the slot terminating short of the remote end of the shank opposite the head to form a resilient hinge connection between the shank and head portions. On the exterior of the shank portions, opposite the slot, there are provided shoulder means intermediate the extremities of the shank with the shoulder means providing retention means having a diameter greater than the diameter of the workpiece aperture. The shoulder means are axially spaced from the head to accommodate the material thickness of the workpiece between the shoulder means and the underside of the head.

The head and shank portions are resiliently flexible toward each other about the resilient hinge portion to permit passage of the shank through the workpiece aperture either before or after the fastener is assembled to the link rod. The head is provided with recess means including spaced groove means to accept the annular rings on the link rod with the recess means opening into the slot and extending generally normal to the axis of the fastener.

An additional object of the present invention is to provide a plurality of spaced rings on said link rod having differing diameters with the larger diameter providing a high sharp annular ring providing high unit pressure in the recess grooves while the adjacent intermediate rings are of a lesser diameter and more blunt in configuration to assist in preventing cold-flow of the recess material around the large sharp thin rings.

Still another object of the present invention is to provide an economical device which can be readily manufactured and will overcome the deficiencies of the prior art.

BRIEF DESCRIPTION OF THE DRAWINGS

FIG. 1 is a perspective view in expanded relation showing the elements of a preferred embodiment of the present invention prior to assembly;

FIG. 2 is an elevational view in section showing the mating relationship of the link rod with the head recess of the preferred embodiment shown in FIG. 1;

FIG. 2a is an elevational view in section showing an alternate form of recess in the head prior to assembly and which will assume a final position similar to that shown in FIG. 2;

FIG. 3 is a perspective view in partial section of a second embodiment of the present invention;

FIG. 4 is an elevational side view, in partial section, of a link rod of the type capable of association with the embodiment shown in FIG. 3:

FIG. 5 is an enlarged view of a portion of the link rod shown in FIG. 4;

FIG. 6 is an enlarged elevational view in partial section of a portion of the thread form shown in FIG. 1;

FIG. 7 is a side elevational view of a further embodiment of the fastening device when it is molded in a flat position and shown in phantom in the final position.

FIG. 8 is a partial plan view taken along line 8—8 of FIG. 7; and

FIG. 9 is still another embodiment showing the use of grooves in the elongated member or link rod when associated with ribs in the recess of the head portion.

DETAILED DESCRIPTION OF THE INVENTION

Referring now to FIGS. 1 and 2 which illustrate a first preferred embodiment of the quick-connect device of this invention. An assembly of the type contemplated by the present invention, includes a fastener 10, an elongated member or link rod 12, and a work member 14 having an aperture 16 therein. The fastener 10 includes a head 18 having a maximum dimension substantially larger than aperture 16, an axially extending shank 20 with intermediately positioned retention means, such as the shoulder 22, spaced from the head 18 a distance generally equal to the thickness of the work member 14. An axially extending slot 24 bisects the head 18 and shank 20 generally along its axis and terminates short of the free nose end of the shank remote from the head to form a resilient hinge 26 which interconnects symmetrical head and shank leg portions. The head 18 includes a recess 30 in both of its symmetrical portions that extend normal to the axis of the fastener and have a predetermined diameter greater than the width of the slot 24. The recess 30 further includes a plurality of spaced grooves 32 and 34 each having a predetermined depth relative to the axis of the recess 30. That portion of the head 18, adjacent the upper terminal end of slot 24, is provided with lead-in means 36 such as a chamfer or a radius to thereby provide a more open throat to the slot, as will be described hereinafter.

The elongated member or link rod 12 carries a plurality of ring-like members 40 and 42 in axially spaced encircling relation. In this preferred embodiment, the rings 40 have a relatively large diameter, are generally V-shaped in cross-sectional configuration and have an included angle between opposite faces falling in the range of approximately 20° to 45° with the preferred included angle of approximately 30°. This provides a very sharp thread-like form to the ring 40 with a preferred ramp angle of approximately 15° as measured relative to a plane perpendicular to the axis of the rod 12. The intermediate smaller diameter annular rings 42 have a normal included angle of 60° between the side faces and thereby provide a ramp angle of 30° on each face, as measured from a plane normal to the axis of the rod 12.

To assemble the device the fastener 10 can be telescopically assembled with the aperture 16 until the head 18 rests on the exposed surface while the shoulders 22 engage the rear surface of the workpiece 14. The rod 12 is then moved normally to its axis by introducing it into the lead-in portion 36 and thence into the recess 30 with the rings 40 seating in grooves 32 while the rings 42 seat in the shallower grooves 34. The assembly can also be accomplished by first snapping the head 18 over the rod 12 and then the shank 20 introduced into the aperture 16.

The use of the large diameter rings 40 with their shallow ramp angle of approximately 15° provides a large projected surface area to withstand the forces encountered with the axial loading of the rod. In using only a high "ring" there is the possible disadvantage that the knife edge would tend to sink deeper into the plastic of head 18 because of "cold-flow". This is overcome by use of the low "ring" to provide additional contact area for reducing unit pressure and additionally providing secondary expansion force to the bushing when the rod is inserted into the recess 30. In essence, the additional contact area of the lesser diameter ring 42 backs up the knife edge of the larger diameter ring 40. This is graphically illustrated in FIG. 2 which is a partial sectional view of the contact of the rod 12 and the rings 40 and 42 carried thereon with the head 18.

While the preferred embodiment in FIG. 1 shows grooves 32 and 34 being formed in the recess 30 of head 18 for acceptance of the rings 40 and 42, respectively, it would be acceptable to utilize a modified recess 30a, as shown in FIG. 2a. In this modified form the recess 30a of head 18a is provided only with grooves 32a. The groove 32a has a nominable depth indicated as $H_1$; and due to the knife edge of the ring 40a, it is expected that it will penetrate the material of head 18a to a greater depth, which is shown as $H_2$. Further penetration by the knife edge 40a will cease when the secondary or smaller diameter rings 42a partially penetrate the surface of recess 30a as shown in phantom on either side of the groove 32a. Thus, the greater diameter and associated projected surface area of the large diameter ring 40a provides a capability to withstand large forces encountered with the axial loading of the rod 12, while the blunter or larger included angle surfaces of secondary rings 42a prevent increased penetration by the sharp thread-like ring 40a. This is necessary since if ring 40a penetrates the head 18a too far, due to cold-flow, there will be a tendency for the slot 24 to close up and the shoulder 22 to become disengaged from their retaining function in aperture 16.

A second embodiment of the present invention can be seen by referring to FIGS. 3 and 4 wherein similar numerals are utilized to designate similar parts with the addition of the suffix "b". In this embodiment, the head 18b is a generally elongated member positioned substantially normal to the axis of the fastener and an axially extending shank 20b, a resilient hinge or nose portion 26b defined by the bisecting slot 24b forming symmetrical shank and head portions. In this embodiment the recess 30b includes a plurality of spaced grooves 32b substantially normal to the axis of the recess 30b. The grooves 32b are extended, in this embodiment, to project into, in a shallower form, the lead-in portion 36b. In this fashion the extensions of slots 32b in the lead-in portion will provide means for orienting the head 18b and its associated grooves 32b relative to the rings on the complementary rod 12b, shown in FIG. 4. It will be noted that the present embodiment utilizes a generally square form ring 40b having a large diameter and a smaller square form ring 42b, with the ring 40b being acceptable in the groove 32b and with the smaller ring 42b riding on the face of recess 30b.

The high projected area of the large ring 40b provides excellent ability to withstand forces encountered with the axial loading of the rod 12b, while the smaller diameter ring 42b will withstand the cold-flow around the thin large ring 40b by providing high unit pressure on the interior of recess 30b. While it will be readily understood by those skilled in the art that the one-piece plastic fastener 10 can be manufactured by normal injection molding techniques from materials such as nylon, the rod 12, in order to withstand the tensile forces applied thereto, is normally a metallic rod. The rings thereon can be thread rolled, and in order to provide sufficient material for the large diameters desired, material can be captured from the initial rod diameter and extruded in the die from grooves adjacent to the large diameter rings 40. This technique is shown generally in FIGS. 6 and 5 wherein the grooves 50 and 50b provide the material necessary to form the large diameter rings 40 and 40b, respectively. When this technique is utilized it will be appreciated by those skilled in the art, that when there is adequate cold-flow of the plastic material in head 18, it can move into the grooves 50 or 50b, as the case may be, and thereby add to the holding power of the fastener 10 to the rod 12. It will be further observed that the disposition of these rings generally perpendicular to the axis of the recess 30 insures the elimination of the cocking or canting of the rod 12 as was experienced in prior art devices when axial loads were placed on the rod 12.

Referring now to FIGS. 7 and 8 wherein similar parts are designated by similar numerals with the addition of the suffix "c", the fastener 10c is molded in a flat or open position with the hinge 26c being a generally flat resilient member carrying the shank portions 20c and the head 18c extending laterally in opposite directions from the hinge portion 26c. The recess 30c and its associated grooves 32c can be readily fabricated in a two-place mold when the fastener 10c is molded in this open position. The two symmetrical shank and head portions be then folded about the hinge 26c into the position shown in phantom in FIG. 7. This embodiment may also include a post or rib-like member 60 which extends perpendicularly from the hinge portion 26c in its initially molded condition. The post 60 generally has a dimension substantially less than the width of the leg portion 20c of the shank and serve to insure that the symmetrical portions of the fastener 10c are maintained in spaced apart relation so that there is a slot 24c, as shown in phantom. The post 60, by spacing the shank portions 20c adjacent the hinge 26c, insures that the shoulder means 22c will always be aggressively urged into underlying relation to the aperture with which it will be associated. This embodiment, therefore, will have substantially the same operating characteristics as the initial two embodiments having the solid resilient hinge 26 and 26b, as seen in FIGS. 1 and 3, respectively.

FIG. 9 is a schematic showing of still another embodiment of the present invention wherein similar parts are designated by similar numerals with the addition of the suffix "d". In this embodiment, the rod 12d instead of carrying rings, as shown in the prior embodiments, is provided with a plurality of axially spaced grooves 70 which cooperate with inwardly directed semi-circular ribs 72 positioned internally of the recess 30d of head 18d. It will be appreciated that the assembly, operation and function of this part is the converse and yet related to the prior embodiments disclosed.

Each of the various embodiments disclosed provide means for overcoming the deficiencies of the prior art mentioned above. An economical, quickly assembled, easily adjustable means is provided for retaining the end of a linkage rod 12 to a workpiece, such as a lever 14, through means of the snap fastener 10. Adjustment can be readily accomplished by disengagement of the rod from the recess 30 and its associated grooves, movement of the rod 12 relative to the head 18 and re-introduction into a new position. Superior holding power of a rod 12 of the present design relative to a fastener 10 is created when the embodiments of the present invention are utilized. Applications for such assemblies can be found in door lock mechanisms, seat adjuster mechanisms and other manual functions performed relative to ancillary equipment found in an automobile. Other uses and modifications to the present invention will be apparent to those skilled in the art.

I claim:

1. An assembly of a one-piece plastice linkage quick-connect fastener with an elongated rod-like member for coupling said elongated rod-like member to a work member having a complementary aperture therein, said fastener including a laterally extending head having a size substantially greater than the diameter of said aperture, and an axially extending shank, a slot extending axially of the fastener through the head and the shank and terminating short of the free nose end of said shank remote from said head thereby forming a resilient hinge connecting symmetrical head and shank leg portions, each of said legs including shoulder means intermediate the extremities of their exterior surfaces and spaced from said head, said head including recess means extending normal to the axis of said fastener and having a predetermined diameter greater than the width of said slot, said elongated member having a plurality of thin axially spaced annular rings and said recess means including substantially complementary grooves in the wall of said recess means for retaining said elongated member in fixed relation along the axis of said recess and member, said rings having a predetermined larger diameter than the diameter of said elongated member, a second set of rings each positioned medially between said larger rings along the axis of said elongated member, said second set of rings having a diameter smaller than the diameter of the first mentioned rings but larger than the diameter of the adjacent portion of said elongated member, said second set of rings having an included angle between their side faces substantially greater than the included angle between the side faces of the first mentioned larger diameter rings, whereby said first larger diameter rings provide a sharp broad face against shear in said fastener recessed groove and said second set of rings provide high lateral pressure against said recess walls to control cold flow about the larger rings, said head adjacent said slot being provided with lead-in means throughout its length to guide said elongated member into said recess as well as to cam said head apart and enlarge said slot to expose said recess means to said elongated member, said elongated member being a metallic rod and having said rings thread rolled on said rod adjacent one end thereof, said thread rolled rings each having adjacent grooves in said rod which provide the material that is displaced during thread rolling to form the adjacent larger diameter annular rings and said second set of annular rings, said fastener recess having grooves in the walls forming said recess which have a diameter less than the diameter of said larger diameter rings whereby said larger diameter rings are adapted to bite into said fastener recess grooves and produce cold flow of the fastener material into adjacent rod grooves with said second set of rings controlling the amount of cold flow about said larger diameter rings to prevent closing up of said slot and thereby insure engagement of said shoulder means with the aperture in the work member.

2. A fastener of the type claimed in claim 1 wherein said lead-in means including shallow grooves aligned with complimentary grooves in said recess and adapted to accept and guide said annular rings on said elongated member as it is inserted into said head recess.

3. A fastener of the type claimed in claim 1 wherein each of said larger diameter rings have a generally sharp V-shaped thread-like configuration having an included angle falling in the range of from 20° to 45°.

4. A fastener of the type claimed in claim 3 wherein said rings have an included angle between side faces of substantially 30°.

5. A fastener of the type claimed in claim 3 wherein said second set of rings each positioned medially between said large diameter rings have a diameter in between the diameters of said first mentioned rings and said elongated member.

6. A fastener of the type claimed in claim 3 wherein said second set of rings are generally V-shaped in configuration and have an included angle between their side faces of substantially 60°.

7. A fastener of the type claimed in claim 6 wherein said recess means includes grooves generally complimentary to said larger rings but no grooves for the lower rings whereby said lower blunt rings contacting the broad surfaces of said recess provide an expansion force to assist in opening the slot for insertion of the rod as well as assisting in preventing cold-flow around the larger diameter rings.

8. A fastener of the type claimed in claim 1 wherein said fastener is initially molded in a flattened condition with the two symmetrical shank and head portions extending outwardly from opposite sides of said hinge whereby said head and shank leg portions are adapted to be folded into opposed relation about said hinge.

9. A fastener of the type claimed in claim 8 wherein said hinge includes spacer means extending perpendicular to said hinge which lies generally on the axis of said fastener and engages said legs when folded to maintain said legs in spaced relation to insure non-closing of said slot.

10. A fastener of the type claimed in claim 9 wherein said spacer means is a semi-rigid post having a thickness less than the width of said legs and hinge.

11. A two-part assembly including an elongated rod-like element with a series of alternate rings formed thereon, there being alternate large diameter thin rings and smaller diameter blunt rings and said rings having different relative included angles between side faces thereof, an embracing retainer element formed of a compressible type material that will deform to encompass portions of the rings so that the axial force for removal will be enhanced by the enlarged porjected area of the larger rings while the smaller rings will exert an outward force against said retainer to balance the forces applied to the larger thin rings and thereby prevent excess cold-flow of the thin rings into the bushing, the larger rings having a difference in unit pressure as compared to the smaller rings as applied to the mating portions of the retaining element, and fastening means connected to said retainer element for mounting said retainer element relative to a workpiece.

12. A fastener of the type claimed in claim 1 wherein at least one of said sets of rings is provided with a non-sharp peripheral edge.

* * * * *